United States Patent [19]
Linder et al.

[11] Patent Number: 5,213,084
[45] Date of Patent: May 25, 1993

[54] FUEL INJECTION SYSTEM FOR INTERNAL COMBUSTION ENGINES

[75] Inventors: Ernst Linder, Muehlacker; Helmut Rembold, Stuttgart, both of Fed. Rep. of Germany

[73] Assignee: Robert Bosch GmbH, Stuttgart, Fed. Rep. of Germany

[21] Appl. No.: 699,016

[22] Filed: May 13, 1991

[30] Foreign Application Priority Data

Jun. 20, 1990 [DE] Fed. Rep. of Germany ....... 4019586

[51] Int. Cl.$^5$ .................................... F02M 41/00
[52] U.S. Cl. .................................. 123/456; 123/506
[58] Field of Search ............... 123/446, 447, 448, 506, 123/456

[56] References Cited

U.S. PATENT DOCUMENTS

| | | | |
|---|---|---|---|
| 4,156,560 | 5/1979 | Cheklich | 123/456 |
| 4,479,475 | 10/1984 | Babitzka | 123/446 |
| 4,492,191 | 1/1985 | Aoki | 123/446 |
| 4,674,448 | 6/1987 | Steiger | 123/447 |
| 4,712,528 | 12/1987 | Shaffitz | 123/446 |
| 4,757,795 | 7/1988 | Kelly | 123/506 |
| 4,788,960 | 12/1988 | Oshizawa | 123/506 |
| 5,058,553 | 10/1991 | Kondo | 123/446 |
| 5,109,822 | 5/1992 | Martin | 123/456 |

*Primary Examiner*—Carl S. Miller
*Attorney, Agent, or Firm*—Edwin E. Greigg; Ronald E. Greigg

[57] ABSTRACT

A fuel injection system, for internal combustion engines in which fuel is brought to high injection pressure and distributed via magnet valves to the various fuel injection locations with the aid of a simple, unregulated high-pressure injection pump; high-pressure injection does not take place until a fuel injection quantity control valve, connected to the distribution of the high-pressure side, has closed a relief line. It thus becomes possible to vary the injection time to the maximum possible extent, without entailing major structural expense.

23 Claims, 2 Drawing Sheets

FUEL INJECTION SYSTEM FOR INTERNAL COMBUSTION ENGINES

BACKGROUND OF THE INVENTION

The invention is based on a fuel injection system as defined hereinafter. In a known system of this kind, a single pump with one pump piston, which via a multiple cam executes a plurality of intake and delivery strokes per cam revolution, is provided as the high-pressure feed pump. The distributor valves with which the known pump is provided are electromagnetic valves, which are urged in the closing direction by the electromotive force and in the opening direction by the delivery pressure of the pump piston upon its delivery stroke. The injection onset is controlled by the drop of these magnet valves, while the end of injection is controlled by a shared electromagnetically actuated control valve that is moved to the closing position when acted upon by current and is moved to the opening position by the pump delivery pressure if the supply of current is interrupted. In this case, two magnet valves must be triggered, and the opening and closing characteristics of each of these valves must be adapted to one another. An expensive multiple cam is additionally necessary, which must drive the pump piston for its delivery stroke. This piston has to pump the entire quantity of fuel to be injected.

OBJECT AND SUMMARY OF THE INVENTION

With the device as defined hereinafter, more uniform pumping is attained with the plurality of pump pistons, and the high-pressure level in the injection lines exhibits only little waviness. Any waviness that nevertheless occurs is synchronized with the respective injection events, in order to avoid deviations in the injection quantity.

In an advantageous feature defined herein, the waviness of the course of the delivery pressure is reduced substantially over time in the phases of the injection, so that identical starting pressures are present at the instant of closure of the fuel injection quantity control valve. Thus, if practically constant pressure conditions prevail, there is virtually n deviation in injection quantity over the duration of injection. If the type of control is suitably selected, for instance in an engine operating by the four-stroke combustion process, the fuel can advantageously be introduced at various times. Fuel injection is advantageously effected directly into the engine combustion chamber; the engine may be either a Diesel engine or an engine with externally supplied ignition. Since advantageously the distributor valves are not exposed to the high injection pressure at the time they switch, they can be made substantially more simply and economically. An advantageous embodiment of the distributor valve is defined by hereinafter.

The invention will be better understood and further objects and advantages thereof will become more apparent from the ensuing detailed description of preferred embodiments taken in conjunction with the drawings.

DESCRIPTION OF THE PREFERRED EMBODIMENTS

For supplying pressure to an internal combustion engine, the ensuing description will refer to a fuel injection system with which fuel is injected directly into the combustion chambers of an engine. This is possible both in self-igniting engines and particularly advantageously in those with externally supplied ignition, because in the latter case, unlike in self-igniting engines, the instant of injection can be selected within wide crankshaft angle ranges, for instance at crankshaft angles of 0° to 360°. In such a system, an engine with externally supplied ignition, for instance, can be supplied with fuel in such a manner that a lean fuel-air mixture is combusted in the partial-load range, with a stratified charge resulting from injection shortly before the instant of ignition in full-load injection, a homogeneous fuel-air mixture with an air ratio of lambda=1 is furnished for combustion by injection during the intake phase.

For generating pressure in this kind of fuel injection system, a high-pressure pump 1 is provided, which may be embodied as an intermittent-delivery series injection pump, radial piston injection pump, or axial piston injection pump, known per se. However, to reduce pressure pulsation, a continuous-delivery pump and in particular a geared pump may also be used. In the intended embodiment the high-pressure injection pump has a plurality of pump pistons, which are driven by corresponding drive cams and pump fuel at high-pressure in a fuel distributor.

Figure 1:
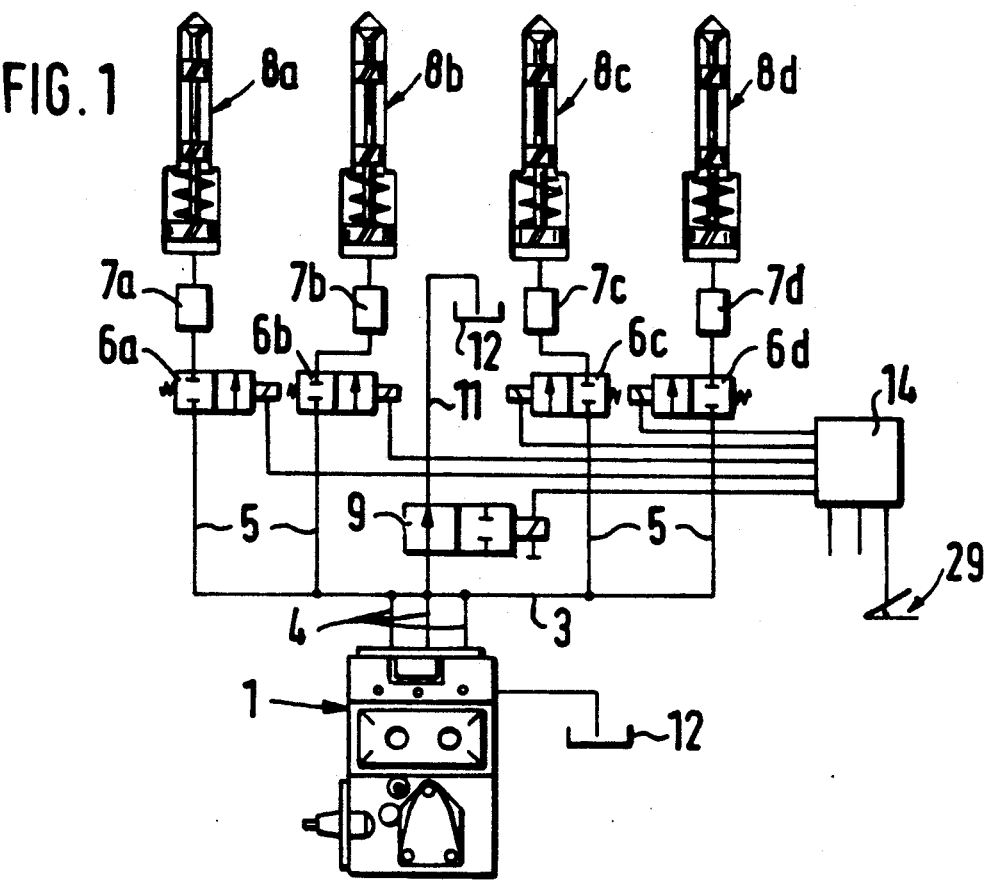
FIG. 1 schematically shows the fuel injection system according to the invention.

The drive cam can advantageously be an eccentric. In FIG. 1, three delivery lines 4 begin at the three pump work chambers of the three-cylinder high-pressure injection pumps and discharge into a distributor 3. From there, injection lines 5 branch off, with one 2/2-way magnet valve 6a–6d, acting as the distributor valve, disposed in each of them. Downstream of this valve in the injection line is a respective pressure valve 7a–7d, which is then followed by the fuel injection valve 8a–8d. Also branching off from the distributor 3 is a relief line 11, via an electrically controlled fuel injection quantity control valve 9, likewise embodied as a 2/2-way magnet valve. The relief line 11 leads to a fuel supply tank 12, from which the high-pressure injection pump is supplied with fuel. The relief line may instead lead to a fuel supply chamber that is kept at a low starting pressure by a presupply pump.

In operation, the high-pressure injection pump pumps the fuel without regulation, at a constant delivery stroke, into the distributor 3. The distributor is initially relieved via the fuel injection quantity control valve 9 which is open when without current, and via the relief line 11, so that the fuel pressure necessary for injection is not attained. The distributor valves 6 are at first all closed, in the non-excited state. Before the intended phase of injection into one of the cylinders of the associated engine, the magnet valve assigned to the applicable fuel injection valve 8 is then opened, under the control of a control device 14, so that communication is established between the distributor 3 and the injection valve 8. Only then is the fuel injection quantity control valve 9 closed. The necessary high fuel pressure then builds up prior to the injection and is thus effective only for the injection valve 8 triggered by the opened distributor valve 6. To end the high-pressure fuel injection, the fuel injection quantity control valve 9 is reopened, and then the previously opened distributor valve 6 is closed.

The pressure control valve 7a–7d is a valve of the kind used in conjunction with injection lines in fuel injection pumps. It is a valve that opens in the delivery direction, which closes at the end of delivery, and in so doing either relieves the fuel injection line via a re-aspiration collar or keeps it at a desired pressure level via a pressure limiting valve.

Figure 2:
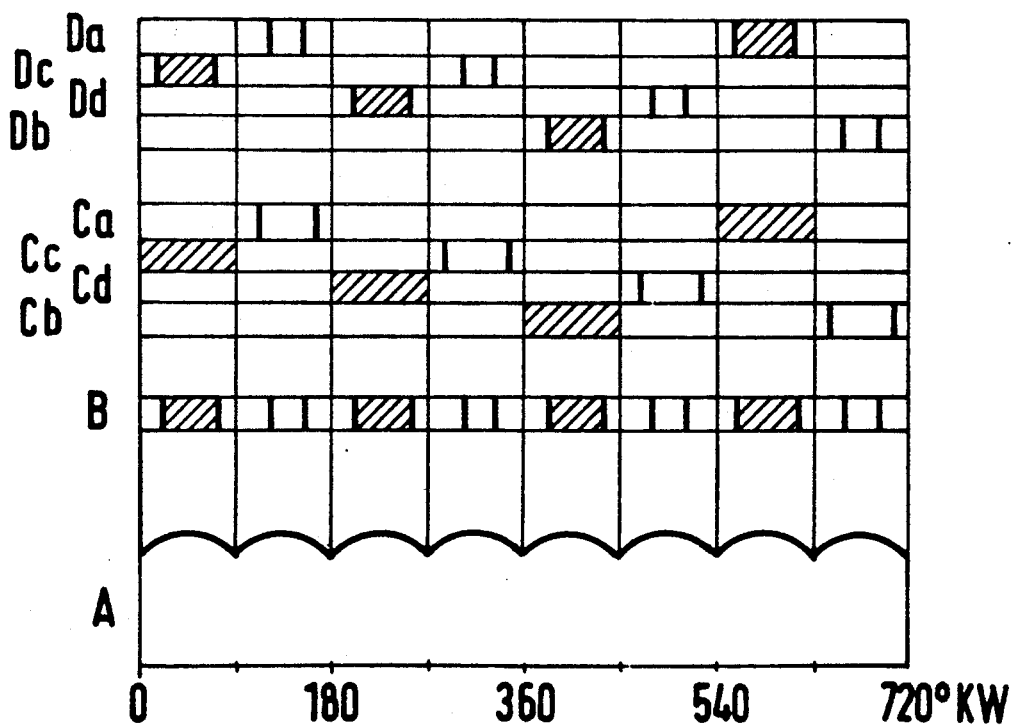
FIG. 2 is a control diagram for triggering of the distributor valve and fuel quantity control valve via the crankshaft angle.

In the diagram of FIG. 2, an example of control times is shown. Part A of FIG. 2 shows the pulsating delivery of the high-pressure injection pump having three pump pistons and corresponding transmission of the drive between the fuel injection pump and the engine. Diagram B shows the closing times of the fuel injection quantity control valve 9, which is open when without current. Plotted above that are the opening times of the distributor valves, and diagram Ca shows the opening times of the control valve 6a, while Cd shows the opening times of the distributor valve 6d. In the diagram above that, the injection times are shown as blocks; the trains Da–Dd show the injection times of the valves 8a–8d. The operation of an engine that operates with direct injection can be embodied such that at full load the engine combustion chambers are supplied with the most homogeneous possible fuel-air mixture, with a mixture ratio of air at an air number of lambda=1, for the sake of operation with the lowest possible toxic emissions. Such an engine can also be equipped with suitable catalytic converters. To attain the desired homogeneous mixture, the fuel in this case is introduced into the combustion chamber already during the intake stroke, in the first or second quadrant of the crank path of the four-stroke engine, so that the fuel can mix or be homogeneously distributed with the introduced air by the instant of ignition. Most advantageously, the fuel is introduced into the combustion chamber at times when there is pronounced air motion, which can be estimated to be in the region of the second quadrant of the crank travel of the crank arm driving the particular engine cylinder. In the partial-load range, this kind of engine can also be operated with a substantially leaner mixture, as well. However, it is then necessary to introduce the fuel shortly prior to ignition, so that an ignitable mixture prevails near the spark plug. The delivery of air for this kind of operation is as a rule unthrottled, so that the combustion chamber is optimally filled at any given time. For this purpose, the injection onset must be shifted correspondingly late, into the third or fourth quadrant of the crankshaft travel. In diagrams B-D, these various kinds of operation are plotted as control or injection times. The fields shown shaded correspond to full-load operation, and the unshaded fields correspond to partial-load operation with a stratified charge and an overall very lean combustion chamber filling.

From the diagrams marked C it can be seen that the particular distributor valve controlling injection is opened early, and after opening of this valve, the fuel injection quantity control valve 9 is closed. The closing time of that valve shown in diagram B then corresponds to the injection phase with a fixed injection onset and with the desired injection duration for the corresponding injection valve shown in D. From diagram A of FIG. 2, it can be seen that residual waviness of the pressure course does exist in the distributor 3. This waviness is designed such that the ranges of highest pressure occur within the applicable injection time. Accordingly, the waviness is synchronized with engine operation such that comparable injection pressures prevail in phases of injection. For instance, the injection of diagram Da in partial-load operation is in the range between 90° and 180° of crankshaft angle as counted in accordance with FIG. 2, or in other words in the region of a pressure peak of A, but the crankshaft angle in the range between 540° and 630° is also located in the region of the pressure peak in the distributor 3. In order to further reduce the residual pulsation at injection times, a continuous-delivery high-pressure pump can be used, or the drive of the high-pressure injection pump can be selected such that the cam driving the pump pistons lends the pump piston a constant delivery speed in the range of the expected injection. This is attained with a so-called constant-stroke cam. With the aid of such constant-stroke cams it is also possible to supply two injection valves in succession with fuel by a single delivery stroke of a pump piston of the high-pressure injection pump, so that either the operating rpm or the number of pump pistons of the high-pressure injection pump can be reduced. Adaptation of the high-pressure injection pump to the engine to be supplied must take into account not only the type of combustion process but also the number of cylinders. The gear ratio must be selected accordingly as well.

Figure 4:
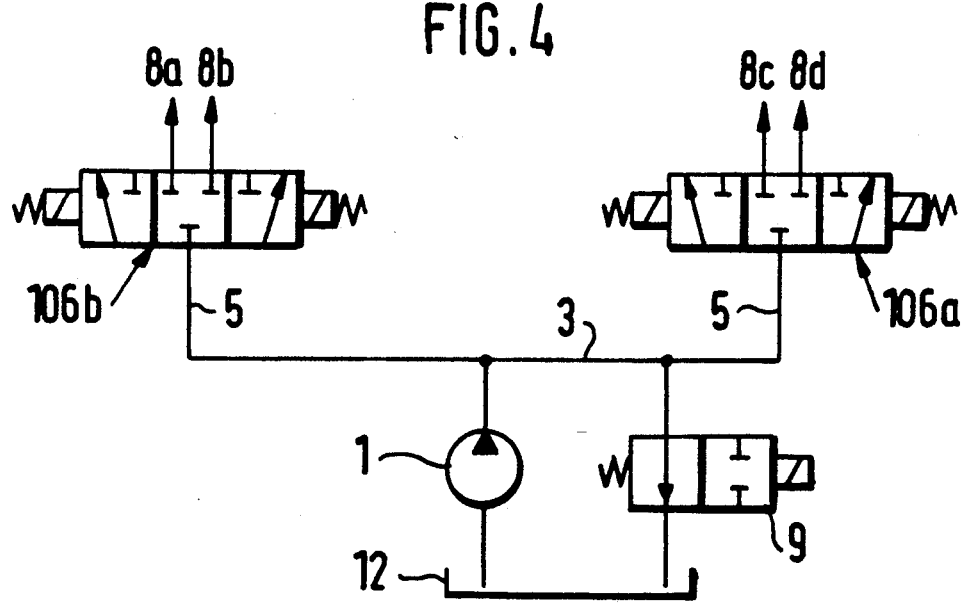
FIG. 4 shows a second exemplary embodiment of the invention, with 3/3-way magnet valves, in a schematic view.

In FIG. 1, it has been shown that for each injection valve, one 2/2-way magnet valve that is closed in the nonexcited state is used in the injection line. Instead, as in FIG. 4, it is possible to use one 3/3-way magnet valve 106a, 106b for each of two injection valves, which in its current-free position of repose has closed the communication between the fuel distributor 3 and the fuel injection valves, while in one excited position it triggers one of the two injection valves and in its other excited position it triggers a different one of the two fuel injection valves.

Figure 3:
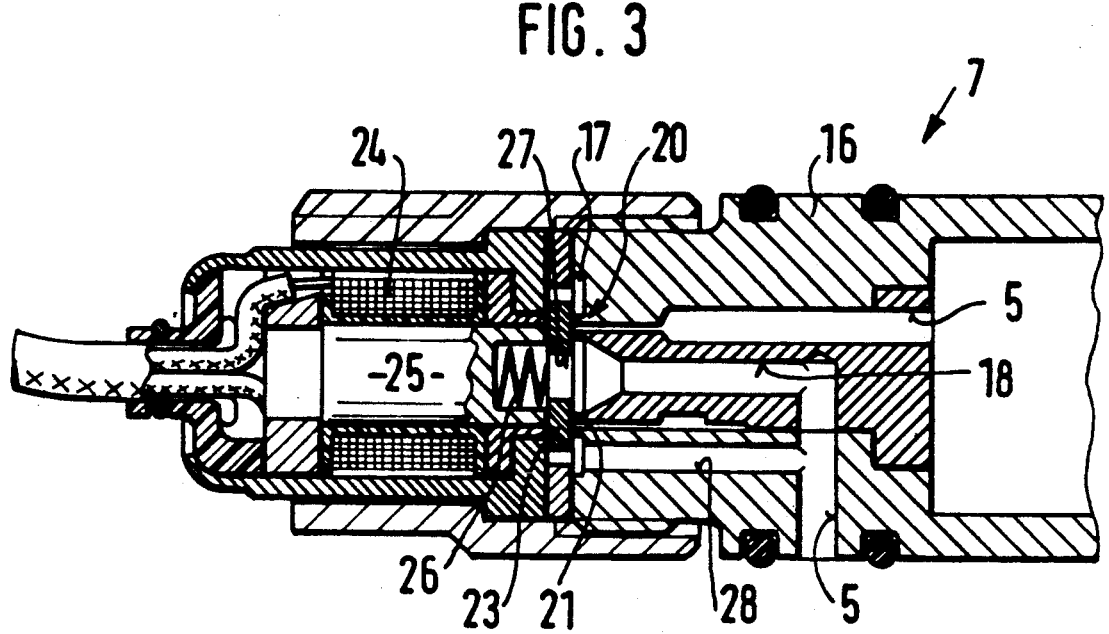
FIG. 3 shows an exemplary embodiment of the distributor valve.

Distributor injection valves in the version shown in FIG. 1 can be found in FIG. 3. The distributor valve 7 has a valve body 16, which has an annular groove 17 on its face end, with an annular valve seat 20 formed between the annular groove and an axial bore 18. The valve seat 20 has a central annular opening 21 on its face end that communicates with the injection line 5 leading to the fuel injection valve. This injection line leads away from the annular opening 21 from the injection valve parallel to the axis of the valve body. The axial bore communicates with the injection line 5 toward the distributor, which discharges radially into the valve body 16 and there discharges into the axial bore 18. Cooperating with the valve seat is an annular disk-shaped valve closing element 23 provided with a central opening 27; this element is at the same time an armature of an electromagnet 24, which is seated tightly o the face end on the valve body 16. A restoring spring 26 is fastened between the core 25 of the electromagnet and the valve closing member and keeps the valve closing member in contact with the valve seat 20 and in so doing closes the continuing fuel injection line 5 off from the axial bore 18. Accordingly, the valve seat is embodied here as a double seat valve and enables fast opening of large flow cross sections. The armature, being an annular disk, has only very slight mass and thus can be moved quickly from its open position in contact with the core 25 to its closing position. The closing position of the valve closing element is supported, with the imposition of pressure from the injection line, by the valve closing element surface remote from the valve seat, since the region between the valve closing element and core 25 and the remaining surrounding region, such as the annular groove 17, communicates in this position with the axial bore 18 via the central opening 27 of the valve closing element. Besides the communication with the axial bore via the central opening 27 of the valve closing element, a parallel communication 28 exists between the injection line upstream and the distributor valve and annular groove 17. The opening stroke of the valve closing element can thus be kept quite short, and the gap between the core 25 and the valve closing element then causes no throttling of the pressure equilibrium or hydraulic braking of the closing element motion. With this construction, a magnet valve that switches very fast for controlling large hydraulic quantities is obtained. With the fuel injection system described, the fuel injection times can be varied within a very wide range to control engines, particularly those with externally supplied ignition and direct injection. The system is simple and economical in design, and with a suitable control device 14 the various operating parameters, such as the position of the gas pedal 29, the rpm, load conditions, and environmental factors can be taken into account.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection system for internal combustion engines having a high-pressure pump (1), which communicates with a plurality of fuel injection valves (8a . . . 8d) via a fuel distributor (3) and via a respective electrically controlled distributor valve (6a, 6b, 6c, 6d), wherein per delivery stroke of the pump piston one fuel injection valve communicates with the high-pressure feed pump, a pressure valve (7a . . . 7d) located in a connection to the fuel injection valve between said respective electrically controlled distributor valve and said injection valve and opens in a delivery direction, and having an electrically controlled fuel injection quantity control valve (9) connected to the distributor (3) and to a fuel supply tank (12), by means of said quantity control valve, the pump work chamber communicates with a relief line (11) to terminate the intended injection phase, said distributor valves (6a . . . 6d) are each opened before the beginning of each injection and closed after the end of each injection, and the injection phase is controlled in terms of the instant and duration of injection by the closing time of the fuel injection quantity control valve (9).

2. A fuel injection system as defined by claim 1, in which a continuous-delivery pump, is used as the high-pressure feed pump.

3. A fuel injection system as defined by claim 1, in which an intermittently operating pump is used as the high-pressure feed pump, having a plurality of reciporating pistons with pump work chambers communicating with the fuel distributor (3) which pistons are driven by a cam and pumping at a constant delivery stroke in a manner chronologically offset from one another.

4. A fuel injection system as defined by claim 3, in which the cam takes the form of an eccentric.

5. A fuel injection system as defined by claim 3, in which the cam has a cam shape that effects a constant stroke speed of the pump piston (constant-stroke cam) in a range of any possible injection phase.

6. A fuel injection system as defined by claim 3, in which one pump piston each supplies fuel to two fuel injection valves in succession.

7. A fuel injection system as defined by claim 4, in which one pump piston each supplies fuel to two fuel injection valves in succession.

8. A fuel injection system as defined by claim 5, in which one pump piston each supplies fuel to two fuel injection valves in succession.

9. A fuel injection system as defined by claim 1, in which the distributor valves are magnet valves (6a . . . 6d), which in a currentless state are closed under the influence of a restoring spring (26).

10. A fuel injection system as defined by claim 2, in which the distributor valves are magnet valves (6a . . . 6d), which in a currentless state are closed under the influence of a restoring spring (26).

11. A fuel injection system as defined by claim 3 in which the distributor valves are magnet valves (6a . . . 6d), which in a currentless state are closed under the influence of a restoring spring (26).

12. A fuel injection system as defined by claim 4, in which the distributor valves are magnet valves (6a . . . 6d), which in a currentless state are closed under the influence of a restoring spring (26).

13. A fuel injection system as defined by claim 5, in which the distributor valves are magnet valves (6a . . . 6d), which in a currentless state are closed under the influence of a restoring spring (26).

14. A fuel injection system as defined by claim 6, in which the distributor valves are magnet valves (6a . . . 6d), which in a currentless state are closed under the influence of a restoring spring (26).

15. A fuel injection system as defined by claim 1, in which the distributor valves are 3/3-way magnet valves, via which one injection valve each can be connected in alternation to the high-pressure injection pump.

16. A fuel injection system as defined by claim 2, in which the distributor valves are 3/3-way magnet valves, via which one injection valve each can be connected in alternation to the high-pressure injection pump.

17. A fuel injection system as defined by claim 3, in which the distributor valves are 3/3-way magnet valves, via which one injection valve each can be connected in alternation to the high-pressure injection pump.

18. A fuel injection system as defined by claim 4, in which the distributor valves are 3/3-way magnet valves, via which one injection valve each can be connected in alternation to the high-pressure injection pump.

19. A fuel injection system as defined by claim 5, in which the distributor valves are 3/3-way magnet valves, via which one injection valve each can be connected in alternation to the high-pressure injection pump.

20. A fuel injection system as defined by claim 6, in which the distributor valves are 3/3-way magnet valves, via which one injection valve each can be connected in alternation to the high-pressure injection pump.

21. A fuel injection system as defined by claim 9, in which the distributor valves are 3/3-way magnet valves, via which one injection valve each can be connected in alternation to the high-pressure injection pump.

22. A fuel injection system as defined by claim 9, in which the distributor valves are embodied as seat valves, with an armature serving as a valve closing element (23) that can be lifted from a valve seat (20) by an electromagnet (24) counter to a force of a restoring spring (26) and is annular in shape, said valve seat is provided with a central flow cross section (27), wherein the valve seat (20) is formed of two concentrically located annular faces, between which an annular opening (21) is disposed as a flow cross section of the fuel injection line (5) controlled by the distributor valve and leading to the injection valve, which line on the other end has a continuously open passage through the central flow cross section (7) of the valve closing element (23).

23. A fuel injection system as defined by claim 22, in which the central flow cross section (27) of the valve closing element communicates continuously with a portion (18) of the fuel injection line (5) extending coaxially with the valve closing element.

* * * * *